United States Patent [19]

Storti

[11] 3,780,609
[45] Dec. 25, 1973

[54] RIBBON-TYPE COMPOSITE SAWING DEVICE

[76] Inventor: Giancarlo Storti, Via Bassa di Casalmaggiore 3, Motta Baluffi, Italy

[22] Filed: Sept. 11, 1972

[21] Appl. No.: 287,643

[30] Foreign Application Priority Data
Mar. 17, 1972   Italy..............................5141A/72

[52] U.S. Cl......................... 83/420, 83/425, 83/433, 83/435.2, 83/808
[51] Int. Cl............................................. B27b 15/08
[58] Field of Search.................. 83/420, 435.2, 788, 83/803, 808, 401, 707, 732, 418, 425, 425.1, 433; 144/242 E, 245 A, 253 F

[56] References Cited
UNITED STATES PATENTS

| | | | |
|---|---|---|---|
| 1,705,808 | 3/1929 | Chichester et al............. | 83/435.2 X |
| 2,711,195 | 6/1955 | Hill..................................... | 83/788 |
| 3,079,961 | 3/1963 | Stark.................................... | 83/420 |
| 3,318,347 | 5/1967 | Alich ............................... | 83/808 X |

Primary Examiner—Donald R. Schran
Attorney—Clario Ceccon

[57] ABSTRACT

A ribbon-type composite saw for obtaining uniform and continuous wooden strips which comprises a pair of frame-supported ribbon-type saws, the frames resting on a base platform and being provided for means for controlling the position of the blades of the saws. This control consists of movable feet on the points of contact of the frames with the platform, which feet are controlled for angular lateral displacement. The wooden workpieces are fed by an endless flight unit to the saws.

5 Claims, 8 Drawing Figures

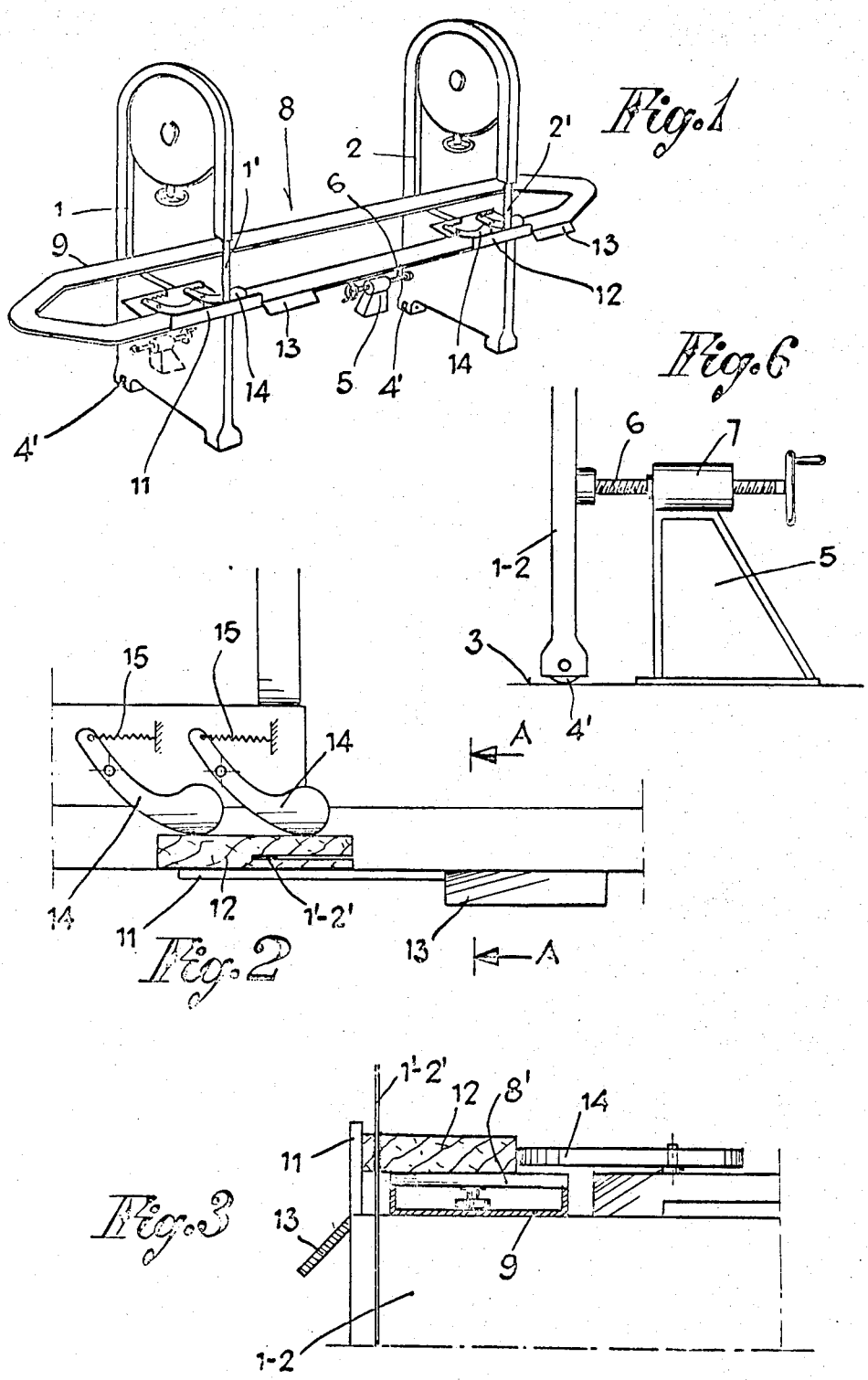

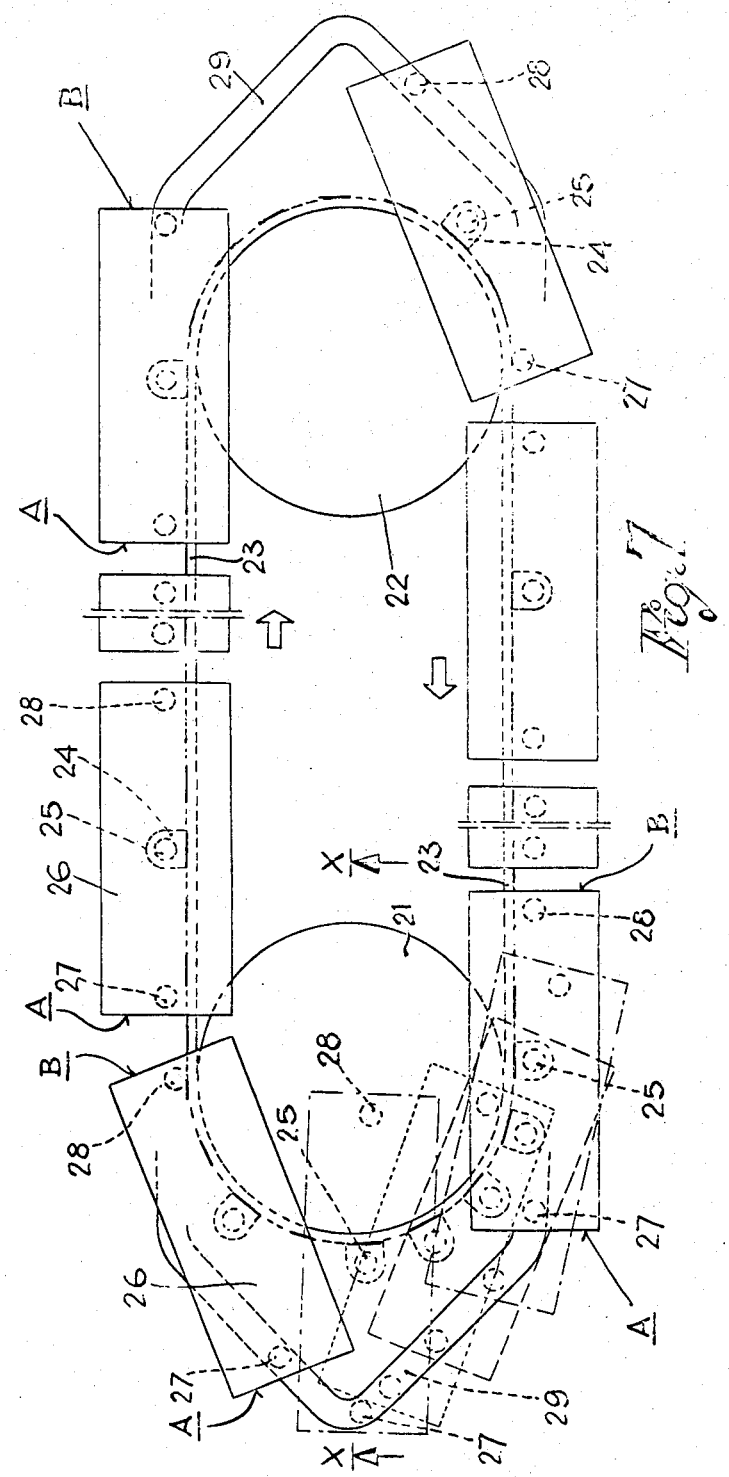

RIBBON-TYPE COMPOSITE SAWING DEVICE

FIELD OF THE INVENTION

The present invention relates to ribbon-type saws, particularly for producing wooden strips suitable for making crates and the like.

SUMMARY OF THE INVENTION

The main object of the invention is to provide a composite ribbon-type saw which comprises at least two ribbon-type saws for the continuous production of wooden strips of uniform thickness and without excessive manual operation.

Briefly stated, the device of the invention comprises: a pair of ribbon-type saws mounted on a single base support and positioned parallel to and spaced from each other; a continuous feeding unit having a plurality of workpiece carrying flights and mounted directly on the work bench of the saws or, alternately, on a separate support member, for the automatic feeding of the workpieces concurrently to both saws; pressing means or pushers positioned in correspondence of the blades of the saws and acting on the workpieces for displacing then transversely on corresponding flights into the working area of the saws.

According to another embodiment of the invention, each ribbon saw is coordinated with the base support so as to be able of angular displacements, as a unit, thus regulating the position of the blade with respect to the workpiece and compensating for the eventual deviations of the blade for obtaining a uniformly cut thickness in the product.

THE DRAWINGS

These and other objects and advantages of the invention will become more apparent from the following detailed description thereof and from the accompanying drawings, in which:

FIG. 1 is a perspective view of the assembly of the device;

FIG. 2 is a top view of one of the pressing means acting on the workpiece;

FIG. 3 is a side view, taken along arrows A—A of FIG. 2;

FIG. 6 is an elevational view of a detail of the device;

FIG. 7 is a schematic top view of the feeding unit of the device; and

DETAILED DESCRIPTION OF THE INVENTION

Figure 4:
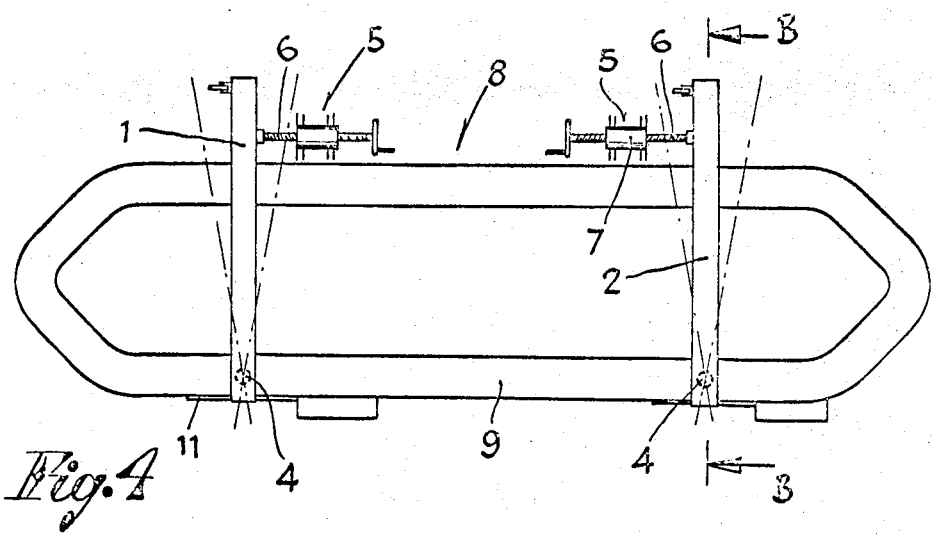
FIG. 4 is a schematic top view of the device of FIG. 1.

The device of the invention comprises two ribbon-type saws 1, 2, both mounted on a base support 3 so as to result parallel to and spaced from each other. The vertical frame of each saw (no number) is connected to the front of the base 3 at 4 in a movable manner, so that it may effect controlled angular displacements, as explained hereinafter. The vertical frame of each saw is connected also to the back of the base 3 by means of casters 4' which run on the base support 3.

To effect and control the displacements mentioned above of each frame of the saws 1, 2 there is a controlling means 5 which comprises, typically but not restrictedly, a large screw 6, mounted and guided on a suitable support 7 fixed to the base support 3. The screw 6 is connected to the frame of a saw so as to move it laterally.

Figure 5:
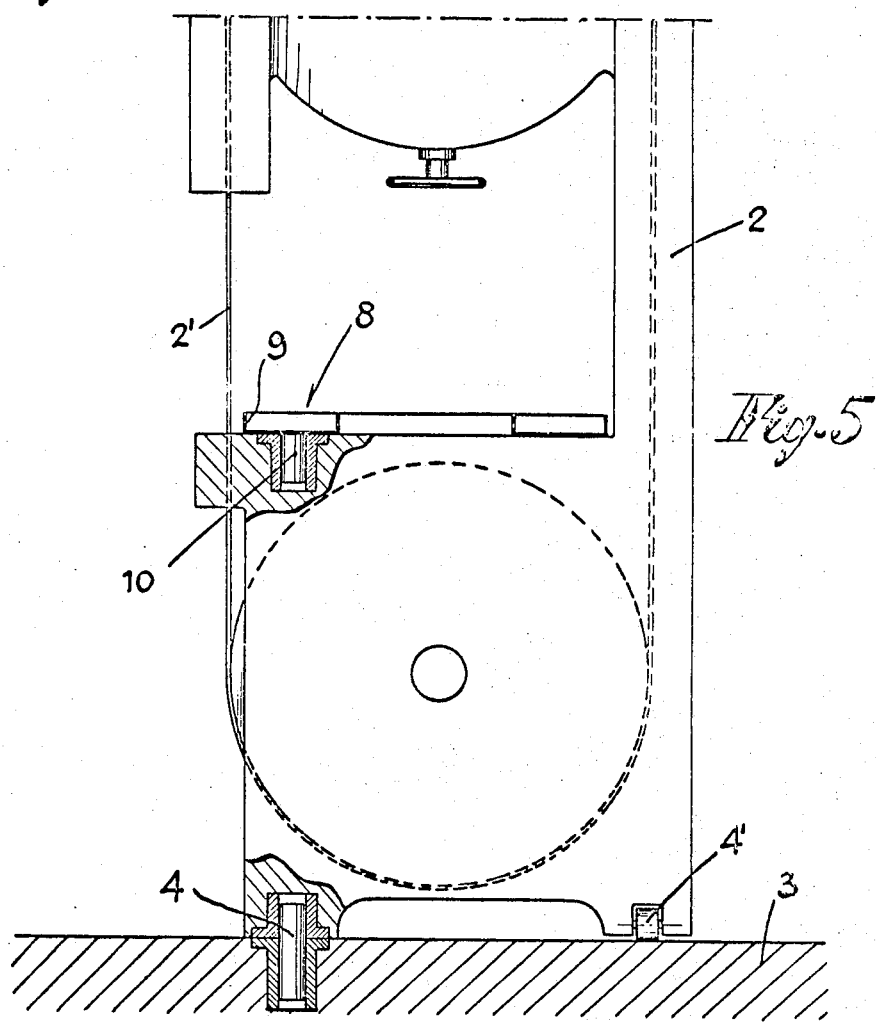
FIG. 5 is a sectional view of FIG. 4, taken along arrows B—B.
Figure 8:
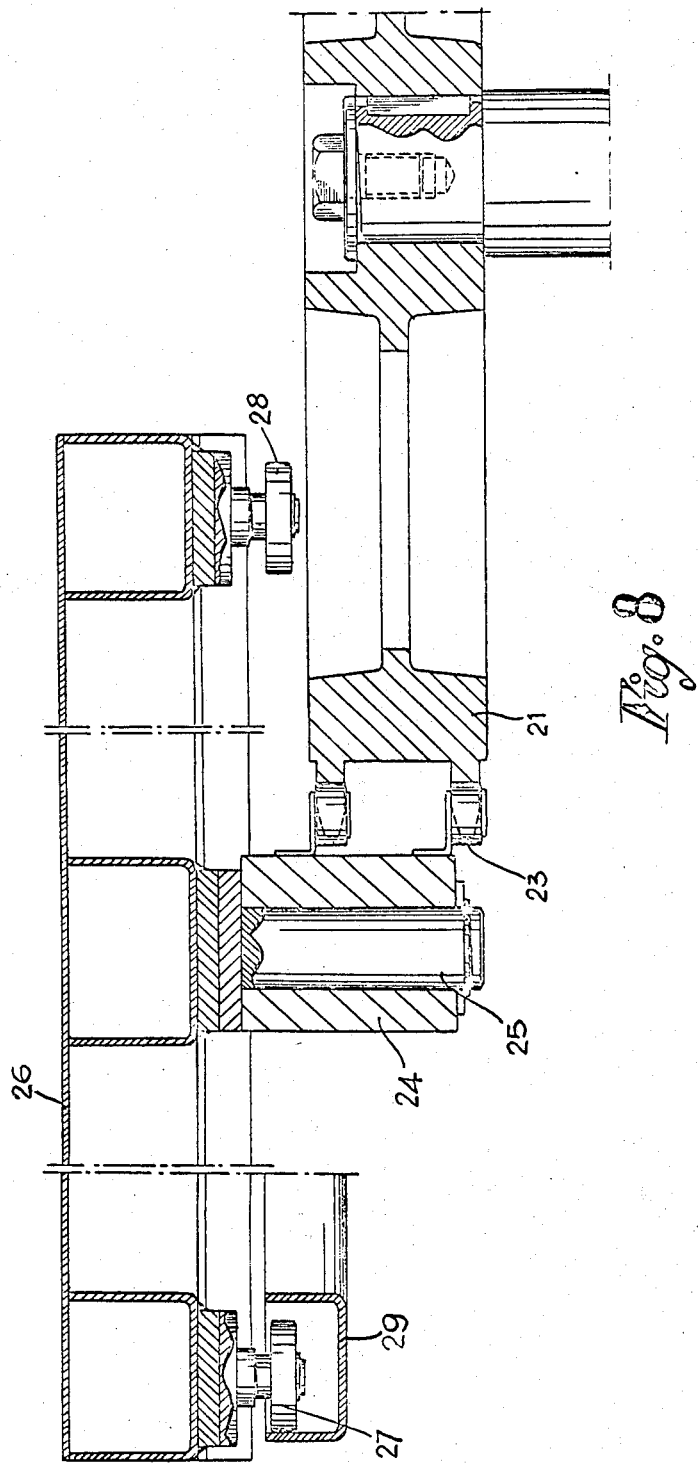
FIG. 8 is a sectional view of FIG. 7 taken along the arrows X—X.

Directly on the work bench of the saws or, if so desired, on a separate platform or support, there is mounted a feeding unit 8 for the continual feeding of workpieces to the saws. This unit 8 is connected to the work benches by means, for example, of pivots 10 fixedly located thereon (see FIG. 5). The feeding unit 8 comprises substantially (see FIGS. 7 and 8) a pair of toothed pulleys 21, 22 which control a chain with rollers 23. To the chain 23 are connected plates 24 on each of which is pivotably connected, via a central pin 25, a workpiece flight 26. This flight 26 forms together with the flights of the other plates a mobile floor or belt in closed circuit and guided along by guide means 9.

Flights 26 are capable of angular movements about their corresponding pins 25 and are, furthermore provided with guide rollers 27, 28 positioned one on each side of the central pin 25 and underneath the flights 26. Laterally of each pulley 21, 22, outwardly thereof, there is a guide means 29 which is V-shaped and has its vertix corresponding to the longitudinal axis of the unit, while the open extremities of the guide means 29 are aligned with the axis of the guiding rollers of the flights during the rectilinear displacement of the flights along the guide means 9.

The chain 23 of the feeding unit 8 drags the flights 26 always in the same direction. The reversal of direction of the flights is determined by the V-shaped guides 29 in which is lodged a roller. This roller, underneath the flight, compels the same to effect angular displacements about the angular movements around the corresponding central pin 5, while concurrently effecting a translational displacement caused by the chain. In this manner, one at a time, the flights are oriented for a rectilinear and opposite run. In their movement to and fro, the flights 26 maintain their sides A and B always facing the same direction with respect to the axial direction of the feeding unit 8.

Laterally of the guide 9 of the flights 26, and in the working area of the blades 1', 2' of the saws, there are mounted two vertical plates 11 which are controllable with respect to their width. These plates 11 constitute guides and holders for the workpieces 12 during the cutting thereof and as these workpieces are being moved by the flights 26 on which they lie.

As a continuation of each plate 11, in the direction of motion of the flights 26, there is provided a slide 13 with inclined surface. This slide cooperates with guide 9 to effect the lateral discharging of the finished products after these have been cut and severed from the workpieces.

Inside guide 9, opposed to the plates 11, there are two pressing means for pushing the workpieces against the plates themselves. Each of these pressing means comprises at least one pair of pushers 14, actuated by springs 15 and positioned so as to act upon the workpieces and move them transversely on the flights 26.

The feeding unit 8 continuously advances the workpieces 12 toward the blades of the saws and, as the workpieces are in juxtaposition with the blades, they are pushed from the outside by means of the pushers 14 against the plates 11 positioned so as to determine the desired thickness of the product to be obtained from the workpieces. When cut, the finished pieces are discharged laterally via the inclined slide 13 and are conveyed away from the saws and from the device by suitable conventional means such as belt conveyors or the like (not shown).

To compensate for any eventual deviation of the blades with respect to the cutting plane, or to compensate for the wear of the blades and, therefore, for the cutting width, each saw 1, 2 may be displaced laterally about the pivot point 4 of their frame by means of the regulating means 5 (see FIG. 4). In this way, the blades may be kept in their optimum working condition and uniformity of cuts and of products may be achieved.

What is claimed is:

1. Ribbon-type composite saw comprising at least a pair of ribbon-type saws parallel to and spaced from each other; a base support for said saws; a vertical frame connecting each saw to said base support; a continuous, horizontal feeding unit for the said saws; a plurality of workpiece flights in said feeding unit; pressing means located in juxtaposition with the working area of said saws for pushing the workpieces transversely to the line of cutting of said saws; frontal feet on said frames resting on said base support for effecting lateral angular displacements; casters provided opposite to said frontal feet and resting on said base support; and means for controlling the angular displacement of said frontal feet.

2. The composite saw according to claim 1, wherein laterally of said feeding unit and in correspondence of the working area of said saws, there are positioned two vertical guide plates for the workpieces, said plates being furthermore positioned opposite to said pressing means.

3. The composite saw according to claim 2, wherein adjoining said guide plates there are provided inclined slides for the lateral discharge of the finished cut product.

4. The composite saw according to claim 1, wherein said feeding unit comprises a plurality of workpieces flights, each pivotably connected to central pins; an endless chain connected to the underneath the said flights and controlled by toothed pulleys; a pair of rollers mounted under said flights, each on each side of said central pin for engaging at the end of a rectilinear displacement of said flights a V-shaped guide so as to cause said flights to effect an angular displacement concurrently to a translational displacement while maintaining directionally unchanged the surfaces thereof.

5. The composite saw according to claim 4, wherein the said V-shaped guides of said feeding unit are displaced outwardly with respect to said pulleys of said chain and wherein said V-shaped guides have their vertix aligned with the longitudinal axis of the feeding unit and their open terminals aligned with the alignment axis of the said guide rollers of the said flights.

* * * * *